United States Patent [19]
Lee et al.

[11] Patent Number: 5,903,543
[45] Date of Patent: May 11, 1999

[54] APPARATUS AND METHOD OF PREVENTING CELL DATA LOSS DURING CLOCK SWITCHING

[75] Inventors: Jun Guy Lee; Young I. L. Kim; Sung Min Song, all of Gaithersburg, Md.

[73] Assignee: Samsung Electronics Co., Ltd., Suwon, Rep. of Korea

[21] Appl. No.: 08/652,020

[22] Filed: May 21, 1996

[51] Int. Cl.⁶ .................................................. H04J 3/06
[52] U.S. Cl. ........................... 370/216; 370/503; 326/10; 327/144
[58] Field of Search .................................. 370/216, 241, 370/395, 503; 326/10, 93, 96; 327/99, 144; 375/371

[56] References Cited

U.S. PATENT DOCUMENTS

| | | | |
|---|---|---|---|
| 5,274,680 | 12/1993 | Sorton et al. | 375/371 |
| 5,483,185 | 1/1996 | Scriber et al. | 327/99 |
| 5,621,722 | 4/1997 | Edmaier et al. | 370/390 |
| 5,668,841 | 9/1997 | Haskell et al. | 375/371 |
| 5,708,686 | 1/1998 | Assmus et al. | 375/372 |

*Primary Examiner*—Min Jung
*Attorney, Agent, or Firm*—Jones & Volentine, L.L.P.

[57] ABSTRACT

In a clock system having active and standby clocks for synchronizing cell data flow in a data system, and for preventing cell data loss during active to standby clock switching, a prevent circuit maintains the active clock cycle signal during the active/standby clock switching to ensure the proper setup time before the active clock is disabled. The prior standby clock will become active during the maintenance period, thereby providing the proper setup time before and after switching, permitting system redundancy without loss of data.

8 Claims, 8 Drawing Sheets

APPARATUS AND METHOD OF PREVENTING CELL DATA LOSS DURING CLOCK SWITCHING

BACKGROUND OF THE INVENTION

1. Field of the Invention

The present invention generally relates to clock circuits for maintaining data integrity in a switching network, and more particularly, to an apparatus and method of preventing cell data loss during clock switching in a network system having redundant clocks in a redundant clock system.

2. Description of the Prior Art

Asynchronous Transfer Mode (ATM) networks require bit and cell timing. At any entrance point to an ATM multiplexer or ATM switch, an individual synchronizer is provided which adapts the cell timing of the incoming signal to the internal timing. Although the ATM network need not be synchronous, it must be able to accommodate Synchronous Transfer Mode (STM)-based applications, including audio and video transmission, as long as they continue in use. To this end the sampling clock of the sender must be provided to the receiver in order to avoid slips. This implies requirements on the network in terms of support for synchronization of the access lines and tolerable slips in the case of synchronization failure.

Redundant clock systems are utilized to ensure standby connections in the event of failure of the main clock. Existing conversion solutions, however, require complex hardware schemes with equally complex timing schemes to convert and transfer the requisite data.

In light of the foregoing, there exists a need for an apparatus and method of preventing cell data loss during clock switching in a network system having redundant clocks.

SUMMARY OF THE INVENTION

The present invention is directed to redundant clock system which substantially obviates one or more of the problems due to the limitations and disadvantages of the related art.

In general, the present invention comprises active and standby clocks for synchronizing cell data flow in a data system, and for preventing cell data loss during active to standby clock switching. A prevent circuit maintains the active clock cycle signal during the active/standby clock switching period to ensure the proper setup time before the active clock is disabled. The prior standby clock will become active during the maintenance period, thereby providing the proper setup time before and after switching, permitting system redundancy without loss of data.

To achieve these and other advantages and in accordance with the purpose of the invention, as embodied and broadly described, the invention provides for a clock system for synchronizing cell data flow in a data system, the clock system having two clocks for preventing cell data loss during clock switching, each of the clocks comprising an oscillator supplying a clock signal; a first translator circuit coupled to the oscillator, the first translator circuit converting the clock signal from a first logic type clock signal to a second logic type clock signal; a frequency divider coupled to the translator circuit for dividing the second logic type clock signal; means for determining and supplying an active or standby state signal to a second translator circuit coupled to the means for determining and supplying, the second translator circuit converting the state signal from a first logic type state signal to a second logic type state signal; a prevent circuit coupled to the frequency divider and the second translator circuit, the prevent circuit outputting the state signal to a first input of an OR logic gate and the frequency divider supplying the divided second logic type clock signal to a second input of the ORD logic gate, a clock driver coupled to said OR logic gate for receiving an output clock signal from the OR logic gate and for distributing the output clock signal to the data system.

In another aspect, the invention provides for a method of synchronizing cell data flow in a data system having active and standby clocks, and for preventing cell data loss during clock switching, the method comprising the steps of: (a) supplying a clock signal; (b) detecting whether the clock signal is supplied from the active or the standby clock according to a first or second state signal, and if the clock signal is supplied from the active clock according to the first state signal; (c) repeatedly supplying the active clock signal to the data system; (d) commencing switching from the active clock signal to the standby clock signal when the second state signal is detected; (e) repeatedly supplying the standby clock signal to the data system; (f) commencing switching from the standby clock signal to the active clock signal when the first state signal is detected; and (g) repeating steps (b) through (f).

It is to be understood that both the foregoing general description and the following detailed description are exemplary and explanatory and are intended to provide further explanation of the invention as claimed.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 4:
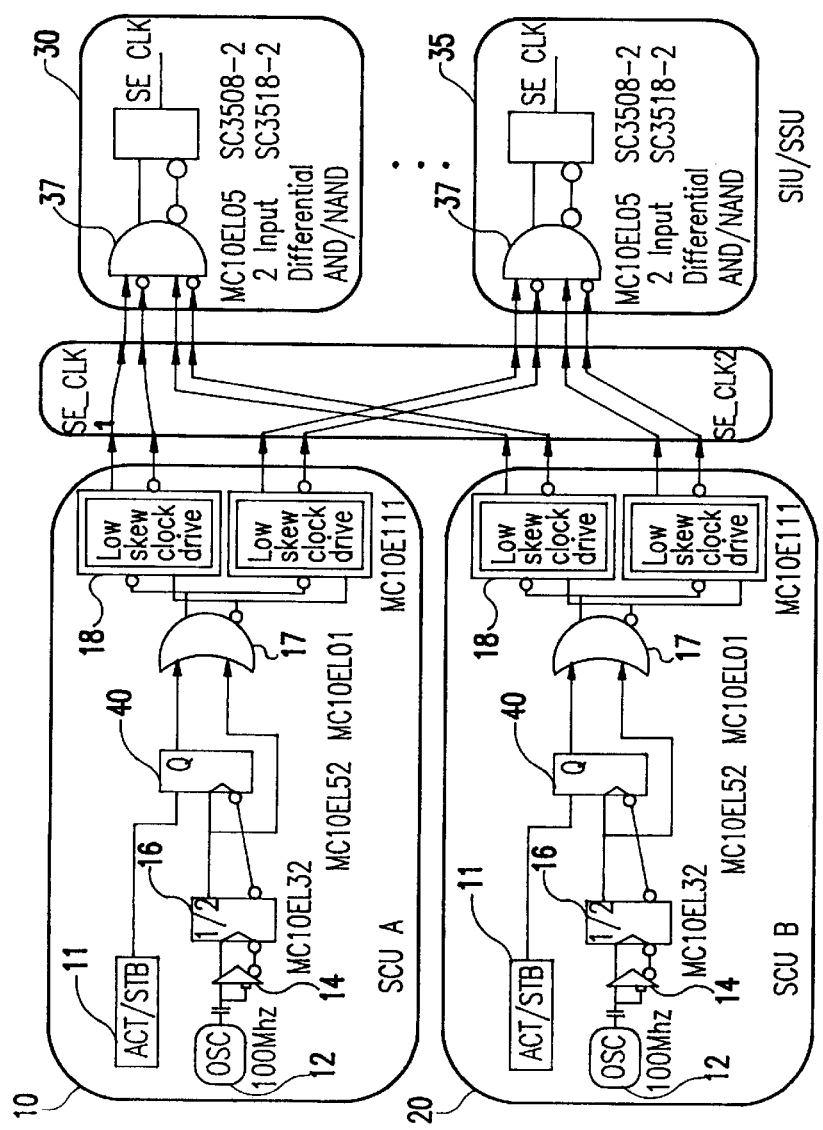
FIG. 4 is a diagrammatical representation of a redundant clock system using the prevent circuit of the present invention.

The present invention is directed to an apparatus and method of preventing cell data loss during clock switching by using a prevent circuit as illustrated in FIG. 4 in a network system having redundant clocks.

Figure 1:
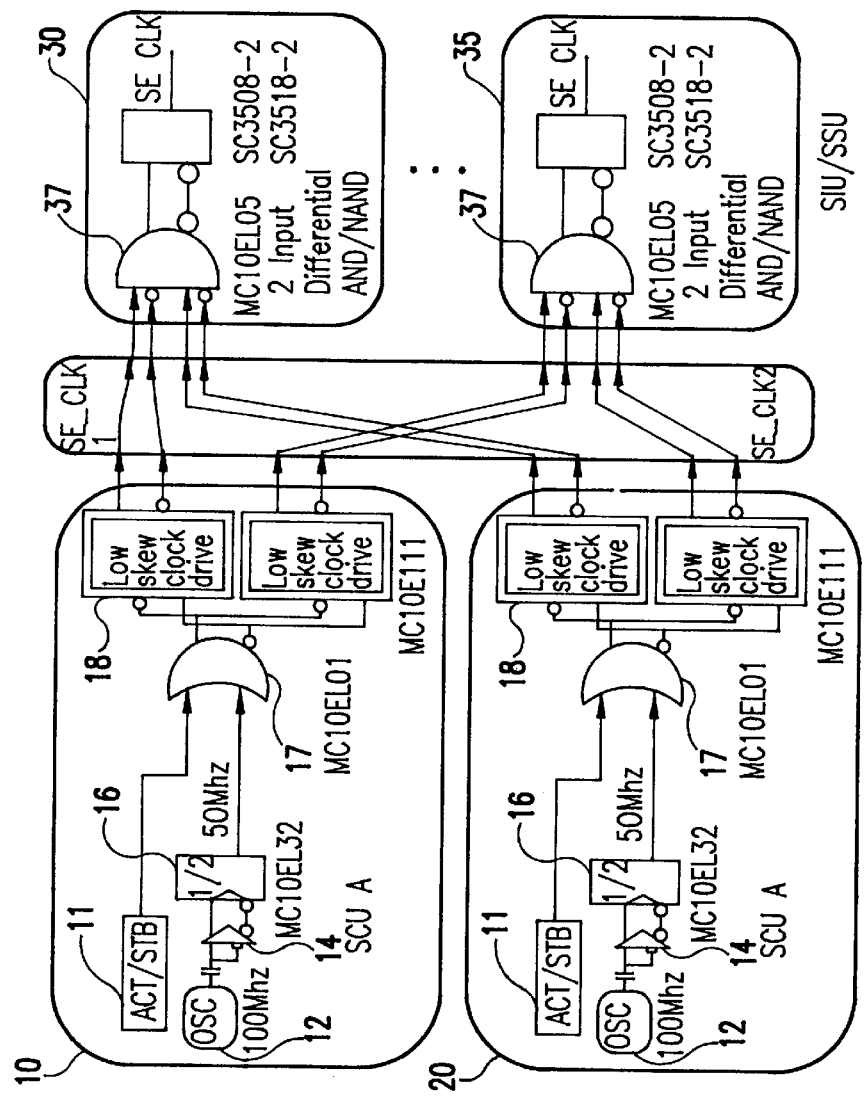
FIG. 1 is a diagrammatical representation of a conventional redundant clock system.

Reference will first be made to FIG. 1, which illustrates a conventional redundant clock system operating in a network for example. A main System Clock Unit (SCU A) 10 and standby System Clock Unit (SCU B) 20 are provided to ensure data integrity in the event of a failure of the particular clock presently supplying the clock signal, either the main SCU 10 or standby SCU 20. The SCU's provide the timing mechanism for a System Switch Unit (SSU), System Interface Unit (SIU, or some other network element. The SCU's 10, 20 are identical, with each being capable of supplying the clock signal to the network system.

The SCU's will now be described in greater detail. Specifically, each SCU 10, 20 contains an oscillator 12 for generating a 100 MHz clock signal. Oscillator 12 is a Transistor-Transistor Logic (TTL) crystal clock oscillator 12 with a 2–4 nanosecond (ns) rise time and fall time, from 0.8 to 2.4 volts. Clock generating oscillators with different parameters may also be used in the practice of this invention.

The active/standby (ACT/STB) 11 control logic determines which of the SCUs 10, 20 is in the active mode with the other being in the standby mode. SCU 10 will be active if the ACT/STB signal is low, that is, the board status is active, and SCU 20 will be active if the ACT/STB signal is "high", that is, the board status is standby.

The 100 MHz clock is supplied to translator circuit 14 which is a dual TTL to positive Emitter Coupled Logic (PECL) translator for high speed operation, having low propagation delay, low clock skew, and differential output characteristics. Because PECL levels are used, only +5 Volts and ground are required.

The PEECL output of the translator 14 is supplied to a 1:2 frequency divider 16 to generate a 50 MHz clock at one-half the duty cycle of the oscillator 12. The SCU 10, 20 also contains an OR-gate 17 having the ACT/STB logic 11 and 50 MHz clock signals as inputs. Differential clock driver circuit 18 supplies the 50 MHz clock signal to multiple SIUs/SSUs, with clock driver circuit 18 being characterized by low clock skew. The differential clock driver 18 in this example is a 1:9 driver, although it is understood that other drivers may be used within the scope of this invention.

Each SIU or SSU 30, 35 contains a dual input AND/NAND gate 37 for reception of the active and standby SCU clock signals, such that each SIU/SSU receives two clock signals, one from the active SCU 10 and one from the standby SCU 20.

Figure 2:
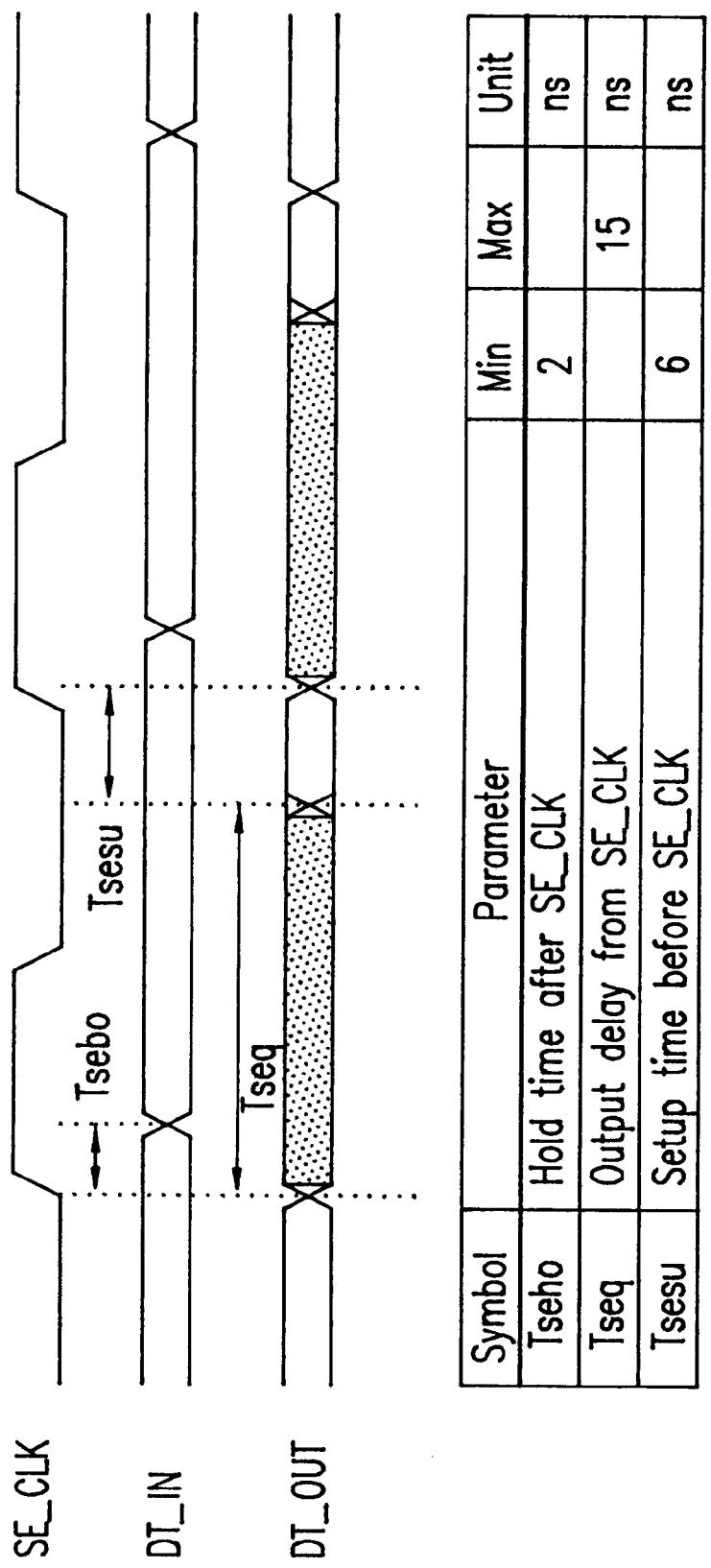
FIG. 2 is a timing diagram illustrating the normal interface timing sequence of a redundant clock system with data loss.

The interface timing sequence of the circuit of FIG. 1 is shown in FIG. 2. SE_CLK is the system switch element clock, which is derived from the AND/NAND gate 37 whose inputs are the active and standby clock signals. In the example illustrated, the hold time $T_{seho}$ after the SE_CLK is enabled is a minimum of 2 nanoseconds (ns), the output delay $T_{seq}$ from the SE_CLK is a maximum of 15 ns, and the setup time $T_{sesu}$ before the SE_CLK is enabled is a minimum of 6 ns. It is understood that this example is illustrative only and that the present invention as described herein can be utilized with clock systems having different setup, hold, and output delay characteristics.

As shown in FIG. 2, under normal operations there is no cell data loss as the data is output (DT_OUT) within the maximum output delay of the SE_CLK, and prior to the setup time of the subsequent clock enabling signal.

Figure 3:
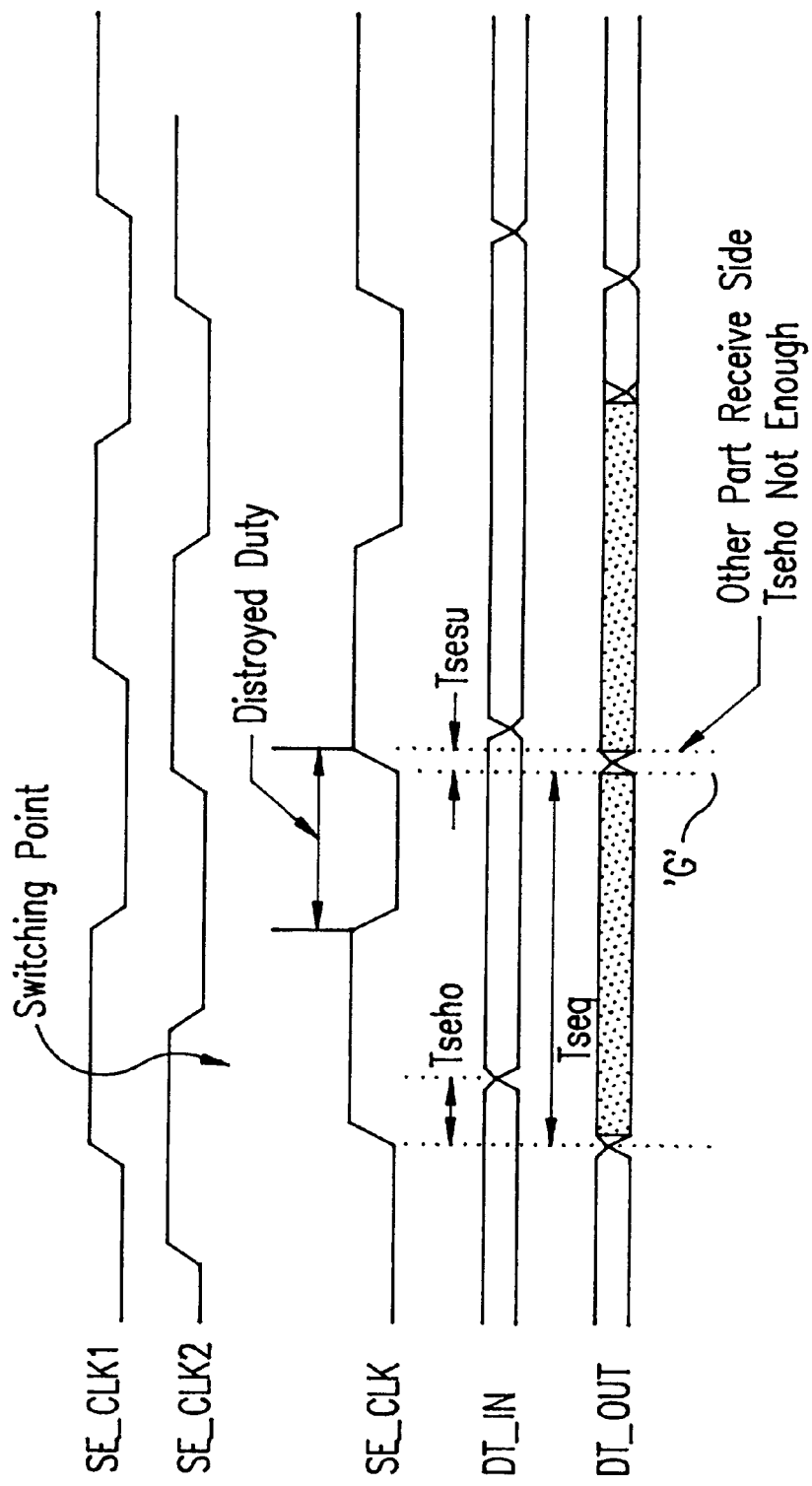
FIG. 3 is a timing diagram illustrating a clock glitch during active/standby clock switching causing data loss.

If the clock source from the active SCU is enabled and it subsequently fails, the standby SCtU will supply the clock signal. Clock glitches can occur, however, during this active/standby SCU switching, causing cell data loss as shown in the timing diagram of FIG. 3. Here, the cell data loss occurs because the data setup time $T_{sesu}$ cannot be met if the 50% duty cycle is not maintained, causing a glitch 'G' as illustrated.

In an effort to eliminate or reduce clock glitches, the present invention employs a prevent circuit 40 (see FIG. 4) that is added to the SCU circuits 10, 20 of FIG. 1. En the following discussion, like reference numerals refer to the same and like parts with oscillator 12, ACT/STB control logic 11, translator circuit 14, and frequency divider 16 performing as described with respect to FIG. 1.

As shown in FIG. 4, the ACT/STB logic signal 11 and 50 MHz clock signal from frequency divider 16 are supplied to the prevent circuit 40, which is located upstream of the OR-gate 17.

Figure 5:
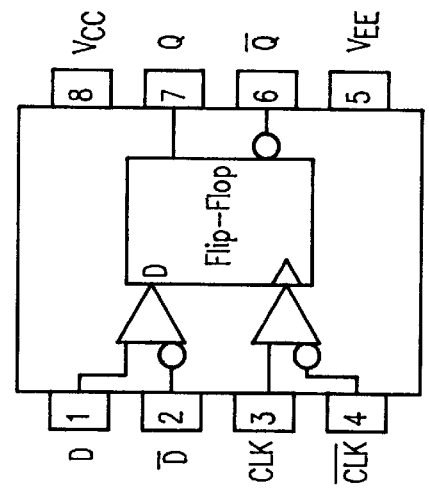
FIG. 5 is a detailed logic diagram of the prevent circuit of the present invention.

Prevent circuit 40 is a differential data, differential clock D flip-flop circuit with a reset as shown in FIG. 5. Data D enters the master portion of the flip-flop when the clock signal CLK is "low" and is transferred to the salve, and thus the outputs Q, upon a positive transition of the clock. The truth table is set forth in Table 1 below, with the symbols defined as L (low), H (high), and Z (L to H transition):

TABLE 1

Truth Table for Prevent Circuit 40

| D | CLK | Q |
|---|-----|---|
| L | Z | L |
| H | Z | H |

Figure 6:
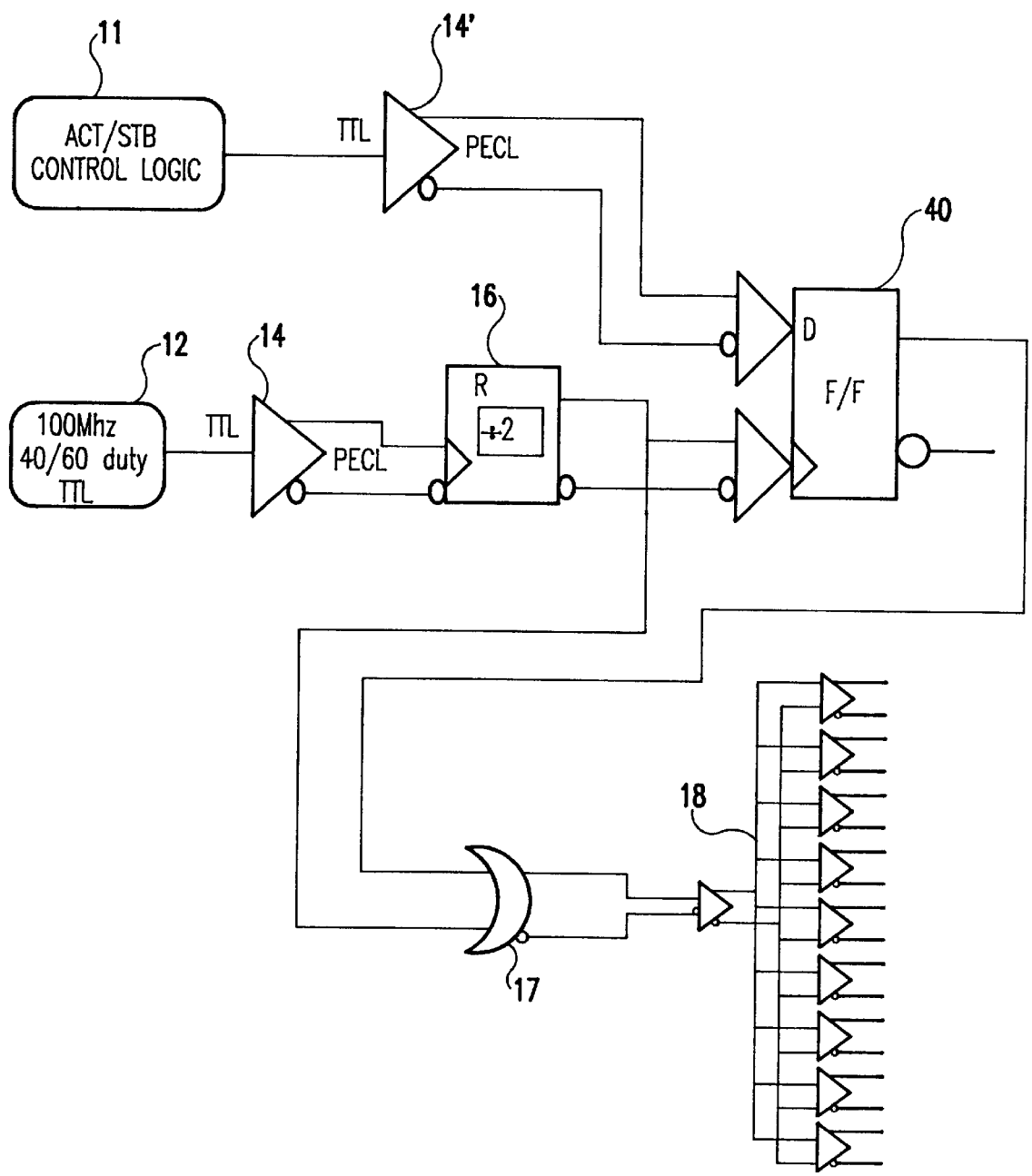
FIG. 6 is a more detailed diagram of the circuit of FIG. 4.

FIG. 6 is a more detailed representation of the circuit of FIG. 4. With reference to FIG. 6, the ACT/STB logic signal 11 is supplied to a second TTL to PECL translator circuit 14', which is then supplied to the data input D of the prevent circuit 40. The 50 MHz clock signal from frequency divider 16 is supplied to the CLK input of the prevent circuit 40. The 50 MHz clock signal from frequency divider 16 is also supplied to the OR-gate 17. Again, differential clock driver circuit 18 supplies the 50 MHz clock signal to multiple destinations, in this case nine are illustrated.

Figure 7:
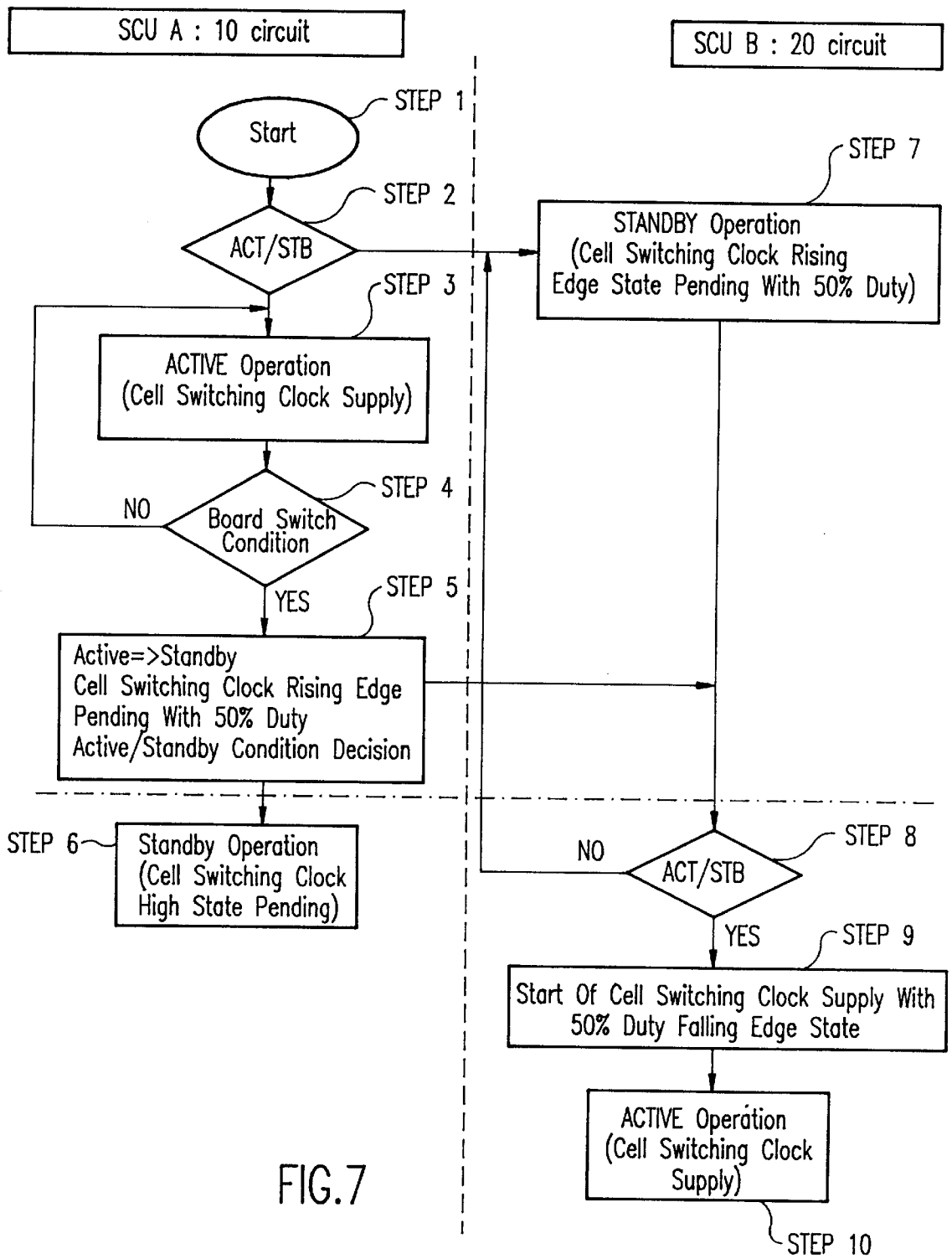
FIG. 7 is a flow chart of the redundant clock method of the present invention.

FIG. 7 illustrates the clock switching method of the present invention that ensures data integrity during the clock switching. In step 1, when the power to the circuit is on, the oscillator 12 generates a 100 MHz clock. Step 2 is the Active/Standby decision block, which is controlled by the ACT/STIB control logic 11. If the board status is active (decision "yes"), the ACT/STB signal is "low", meaning SCU 10 is the active clock. If the board status were standby (decision "no"), the ACT/STB signal would be "high" and SCU 20 would be the active clock (see Step 7).

Step 3 represents the active operation of the redundant clock circuit 10 using the prevent circuit 40. As stated above, the ACT/STB logic signal 11 is supplied to the data input D of the prevent circuit 40, via translator circuit 14'. The 50 MHz clock signal from frequency divider 16 is supplied to the CLK input of the prevent circuit 40 and to the OR-gate 17. In accordance with Table 1 above, if the ACT/STB signal is low, the output signal Q is "low", and this "low" output signal is supplied to OR-gate 17. Therefore, OR-gate 17 receives the "low" status signal from the prevent circuit 40 and the 50 MHz clock signal and output a 50 MHz clock signal to the differential clock driver 18 (see FIG. 6). The differential clock driver 18 supplies the 50 MHz clock signal to various locations.

Step 4 represents the switching point from the active to standby clock in the event of the failure of the active clock. If there is no failure in the active clock 10 (decision "no"), the active operations of Step 3 will be continued. If there is a failure of the main active clock 10 (decision "yes"), the ACT/STB signal will change to "high".

In Step 5, the clock generation function switches from the active clock 10 to the standby clock 20. The ACTISTB "high" signal is supplied to the prevent circuit 40, resulting in a "high" output status signal from the prevent circuit 40 that is supplied to the OR-gate 17. As before, the OR-gate 17 also receives the 50 MHz clock signal from frequency divider 16 as shown in FIG. 6.

Figure 8:
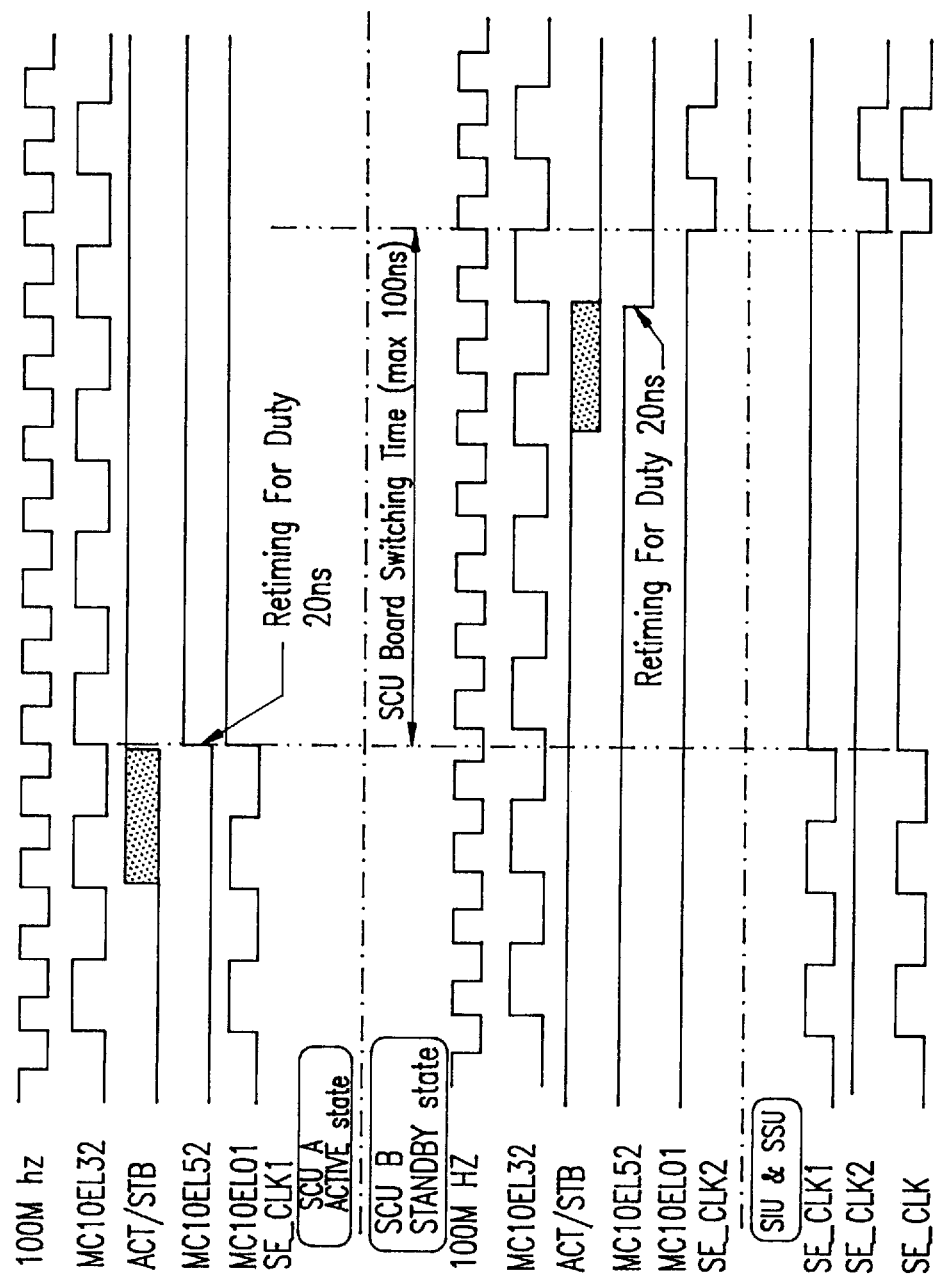
FIG. 8 is a detailed timing diagram illustrating the entire clock and system interface timing sequence in accordance with the present invention.

FIG. 8 depicts the entire timing diagram of the SIU/SSUs and SCUs incorporating the prevent circuit 40. Here, the "high" ACT/STB state corresponds to the ACT/STB signal of SCU A. The "high" output status signal, rising edge pending, of the prevent circuit 40 corresponds to the (MC10EL52) signal as shown in SCU A of FIG. 8. Note also that the (MC10EL32) signal corresponds to the 50 MHz clock signal from the frequency divider 16. The OR-gate 17 circuit output is thus maintained "high", corresponding to the (MC10EL01 SE_CLK 1) signal of SCU A in FIG. 8, which as described above is the logic result of the "high" output status signal from the prevent circuit 40 and the 50 MHz clock signal from frequency divider 16. This "high" signal is then supplied to differential clock driver 18, whose output is also "high". This standby operation is represented by Steps 6 and 7 in FIG. 7.

With the clock circuit operating in standby as illustrated by step 7 in FIG. 7, the next step (Step 8) is a decision block similar to step 2, which is controlled by the ACT/STB control logic 11. If the board status is active (decision "yes"), the ACT/STB signal is "low", meaning SCU 10 becomes the active clock. If the board status were standby (decision "no"), the ACT/STB signal would be "high" and SCU 20 would be the active clock. If "no", SCU 20 would still operate in the standby mode, supplying the main clock. If "yes", the main clock would switch to SCU 10.

In Step 9, the ACT/STB signal changes, with the circuit operation being similar to Step 5. The ACT/STB signal changes to "low", corresponding to ACT/STIB signal of SCU B in FIG. 8. The "low" output status signal, falling edge pending, of the prevent circuit 40 corresponds to the (MC10EL52) signal as shown in SCU B. Note also that the (MC10EL32) signal corresponds to the 50 Mhz clock signal from the frequency divider 16. The OR-gate 17 circuit output is thus "low", corresponding to the (MC10EL01 SE_CLK 2) signal of SCU B in FIG. 8, which as described above is the logic result of the "low" output status signal from the prevent circuit 40 and the 50 MHz clock signal from frequency divider 16. This "low" signal is then supplied to differential clock driver 18, whose output is also "low".

Figure 9:
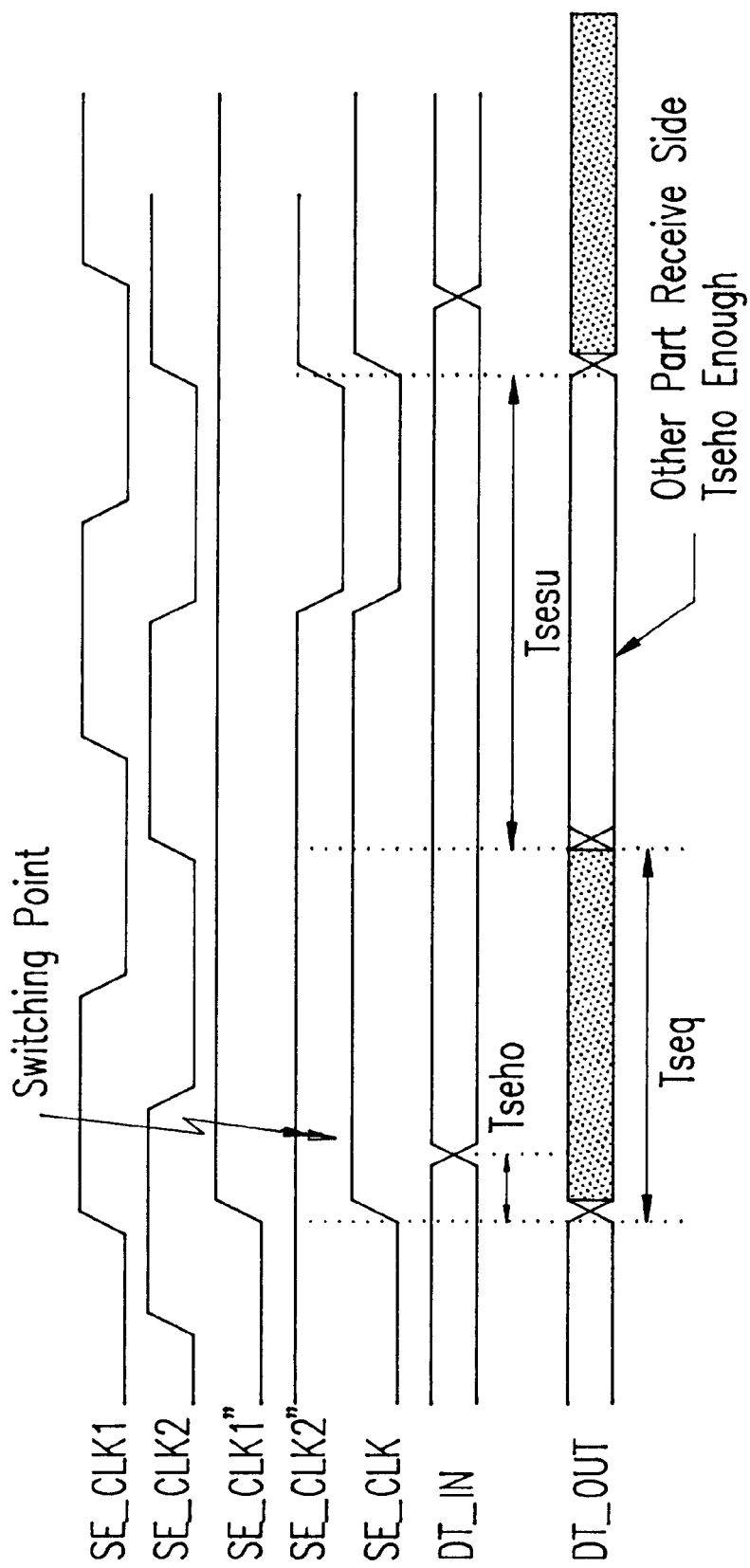
FIG. 9 is another timing diagram illustrating the clock timing sequence with the prevent circuit employed.

In essence, the prevent circuit 40 "maintains" the present clock cycle signal during the active/standby clock switching to ensure the proper setup time before the clock is disabled. The prior standby SCU will become active during the "maintenance" period, thereby providing the proper setup time. The prevent circuit 40 will maintain the 50% duty cycle before and after switching, permitting system redundancy without loss of data. This is shown by the SE_CLK", SE_CLK2", and SE_CLK timing lines in FIG. 9, with SB_CLK1" and SE_CLK2" being the clock signals resulting from the use of the prevent circuit 40. By comparison, SE_CLK1 and SE_CLK2 are the normal (non-prevent circuit) clock signals described previously. The prevent circuit 40 thus maintains the active SCU clock signal until the standby SCU clock signal is activated.

While the invention has been described in terms of the embodiments described above, those skilled in the art will recognize that the invention can be practiced with modification within the spirit and scope of the appended claims.

Having thus described my invention, what we claim as new and desire to secure by Letters Patent is as follows:

1. A clock system for synchronizing cell data flow in a data system, said clock system having two clocks for preventing cell data loss during clock switching, each of said clocks comprising:
   an oscillator supplying a clock signal;
   a first translator circuit coupled to said oscillator, said first translator circuit converting said clock signal from a first logic type clock signal to a second logic type clock signal;
   a frequency divider coupled to said first translator circuit for dividing a frequency for said second logic type clock signal, producing a divided frequency second logic type clock signal;
   means for determining and supplying an active or standby state signal;
   a second translator circuit coupled to said means for determining and supplying, said second translator circuit converting said state signal from a first logic type state signal to a second logic type state signal;
   a prevent circuit coupled to said frequency divider and said second translator circuit, said prevent circuit outputting the state signal in response to a clock transition of the divided frequency second logic type clock signal;
   an OR logic gate having a first input coupled to the prevent circuit and receiving the state signal from the prevent circuit, and a second input coupled to the frequency divider and receiving the divided frequency second logic type signal; and
   a clock driver coupled to said OR logic gate for receiving an output clock signal from said OR logic gate and for distributing said output clock signal to the data system.

2. A clock system as in claim 1, wherein said clock signal is a 100 MHz signal.

3. A clock system as in claim 2, wherein said frequency divider is a 1:2 frequency divider.

4. A clock system signal as in claim 1, wherein said first logic type clock signal is a transistor-transistor logic signal and said second logic type clock signal is a positive emitter coupled logic signal.

5. A clock system as in claim 1, wherein said first logic type state signal is a transistor-transistor logic signal and said second logic type state signal is a positive emitter coupled logic signal.

6. A clock system as in claim 1, wherein said prevent circuit is differential data, differential clock D flip-flop circuit.

7. A method for synchronizing cell data flow in a data system having active and standby clocks, and for preventing cell data loss during clock switching, the method comprising:
   (a) supplying a clock signal;
   (b) detecting whether said clock signal is supplied from said active or said standby clock according to a first or second state signal, and if said clock signal is supplied from said active clock according to a first state signal;
   (c) repeatedly supplying said active clock signal to said data system;
   (d) maintaining the active clock signal in a present active clock cycle while commencing switching from said active clock signal to said standby clock signal when the second state is detected;
   (e) repeatedly supplying said standby clock signal to said data system;

(f) maintaining the standby clock signal in a present standby clock cycle while commencing switching from said standby clock signal to said active clock signal when the first state signal is detected; and (g) repeating steps (b) through (f).

8. A redundant clock system for synchronizing cell data flow in a data system, said redundant clock system comprising:

a main system clock unit, further comprising,
  main clock means, supplying a main clock signal,
  main clock active/standby control logic means, supplying a main clock state signal indicating an active state or a standby state for said main system clock unit,
  main clock prevent circuit means coupled to said main clock means and said main clock active/standby control logic means, said main clock prevent circuit means synchronizing a change of state of the main clock state signal with a change of state of the main clock signal and supplying a synchronized main clock state signal,
  main clock gate means coupled to the main clock prevent circuit means and the main clock means, said main clock gate means gating the main clock signal with the synchronized main clock state signal to supply the main clock signal when the synchronized main clock state signal indicates an active state for said main system clock unit, and
  main clock driver means coupled to said gate means, receiving the main clock signal and supplying the main clock signal to the data system; and a standby system clock unit, further comprising,
  standby clock means, supplying an active clock signal,
  standby clock active/standby control logic means, supplying a standby clock state signal indicating an active state or a standby state for said standby system clock unit,
  standby clock prevent circuit means coupled to said standby clock means and said standby clock active/standby control logic means, said standby clock prevent circuit means synchronizing a change of state of the standby clock state signal with a change of state of the standby clock signal and supplying a synchronized standby clock state signal,
  standby clock gate means coupled to the standby clock prevent circuit means and the standby clock means, said standby clock gate means gating the standby clock signal with the synchronized standby clock state signal to supply the standby clock signal when the synchronized standby state signal indicates an active state for said standby system clock unit, and
  standby clock driver means coupled to said standby clock gate means, receiving the standby clock signal and supplying the standby clock signal to the data system.

* * * * *